(12) United States Patent
Um et al.

(10) Patent No.: US 10,701,752 B2
(45) Date of Patent: Jun. 30, 2020

(54) DEVICE AND METHOD FOR ALLOCATING COEXISTENCE RESOURCE IN UNLICENSED BAND

(71) Applicant: ELECTRONICS AND TELECOMMUNICATIONS RESEARCH INSTITUTE, Daejeon (KR)

(72) Inventors: Jung Sun Um, Daejeon (KR); Kyu Min Kang, Daejeon (KR); Seung Keun Park, Daejeon (KR); Jae Cheol Park, Daejeon (KR); Sung Jin Yoo, Daejeon (KR); Dong Hun Lee, Daejeon (KR); Hoi Yoon Jung, Daejeon (KR); Su Na Choi, Daejeon (KR); Sung Hyun Hwang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 67 days.

(21) Appl. No.: 15/562,005

(22) PCT Filed: Jan. 28, 2016

(86) PCT No.: PCT/KR2016/000921
§ 371 (c)(1),
(2) Date: Sep. 27, 2017

(87) PCT Pub. No.: WO2016/190520
PCT Pub. Date: Dec. 1, 2016

(65) Prior Publication Data
US 2018/0110090 A1    Apr. 19, 2018

(30) Foreign Application Priority Data

May 27, 2015    (KR) .................. 10-2015-0073614

(51) Int. Cl.
*H04W 76/16*    (2018.01)
*H04W 16/14*    (2009.01)
(Continued)

(52) U.S. Cl.
CPC ............. *H04W 76/16* (2018.02); *H04L 5/001* (2013.01); *H04L 5/0048* (2013.01);
(Continued)

(58) Field of Classification Search
None
See application file for complete search history.

(56) References Cited

U.S. PATENT DOCUMENTS 8,326,336 B2    12/2012  Um et al.
2010/0165972 A1*   7/2010  Lin .................. H04L 5/0007
                                                    370/344
(Continued)

FOREIGN PATENT DOCUMENTS

WO    WO-2011/106159 A2    9/2011
WO    WO-2014/064322 A1    5/2014
WO    WO-2014/070066 A1    5/2014

*Primary Examiner* — Huy D Vu
*Assistant Examiner* — Bao G Nguyen
(74) *Attorney, Agent, or Firm* — Rabin & Berdo, P.C.

(57) ABSTRACT

The present invention relates to a device and method for allocating a coexistence resource in an unlicensed band. The device according to the present invention comprises: a frame configuration unit for configuring a subframe in which data and a reference signal for a channel in an unlicensed band are allocated, and allocating a part of the symbols of the subframe as a coexistence resource; a signal detection unit for detecting a signal of another LTE system or Wi-Fi system during a transmission idle period where the coexistence resource is allocated; and a transmission processing unit which, when the signal of another system is detected during the transmission idle period, does not occupy a resource for the next subframe, and when the occupation of the coexis-
(Continued)

tence resource by the another system has ended, occupies the resource for the next subframe.

19 Claims, 10 Drawing Sheets

(51) Int. Cl.
    *H04L 5/00*     (2006.01)
    *H04W 74/08*     (2009.01)
    *H04W 72/12*     (2009.01)
    *H04W 72/04*     (2009.01)
    *H04W 28/06*     (2009.01)

(52) U.S. Cl.
    CPC ....... *H04W 16/14* (2013.01); *H04W 72/1215* (2013.01); *H04W 74/08* (2013.01); *H04W 28/06* (2013.01); *H04W 72/0446* (2013.01); *H04W 72/0453* (2013.01)

(56) References Cited

U.S. PATENT DOCUMENTS

| | | | |
|---|---|---|---|
| 2013/0208587 A1* | 8/2013 | Bala | H04W 16/14 370/230 |
| 2013/0279376 A1 | 10/2013 | Ahmadi | |
| 2014/0044105 A1* | 2/2014 | Bontu | H04L 5/001 370/336 |
| 2014/0185576 A1* | 7/2014 | Lei | H04L 5/001 370/329 |
| 2015/0126207 A1 | 5/2015 | Li et al. | |
| 2015/0139108 A1* | 5/2015 | Takano | H04W 16/16 370/329 |
| 2015/0281974 A1 | 10/2015 | Ghasemzadeh et al. | |
| 2015/0289141 A1 | 10/2015 | Ghasemzadeh et al. | |
| 2016/0255639 A1* | 9/2016 | Chen | H04W 72/02 370/336 |

* cited by examiner (a)

(b)

DEVICE AND METHOD FOR ALLOCATING COEXISTENCE RESOURCE IN UNLICENSED BAND

TECHNICAL FIELD

The present invention relates to an apparatus and a method for allocating a coexistence resource on an unlicensed band.

BACKGROUND ART

In recent years, in a 3rd generation partnership project (3GPP), a standard technology for utilizing a long term evolution (LTE) system that operates in a conventional licensed band used in an unlicensed band of 5 GHz has been developed. A scenario that aggregates and operates carriers of the licensed band and the unlicensed band is first reviewed and Duplex of the unlicensed band considers a time division duplex (TDD) mode considering a downlink or both an uplink and a downlink of frequency-division duplex (FDD).

3GPP LTE is a system in which a base station (eNodeB) controls all resources and the downlink thereof distributes/allocates different resources to a terminal (UE) through orthogonal frequency division multiple access (OFDMA) and the uplink thereof distributes/allocates different resources to the terminal (UE) through single carrier frequency division multiple access (SC-FDMA).

DISCLOSURE

Technical Problem

However, in the conventional licensed band, the base station manages a continuously usable resource, but in the unlicensed band, the base station does not manage the continuously usable resource, and as a result, a resource occupying method considering coexistence with a conventional user and another unlicensed band LTE cell is required.

Technical Solution

The present invention has been made in an effort to provide an apparatus and a method for allocating a coexistence resource on an unlicensed band which allow an LTE system in an unlicensed band and a common use band to provide a resource access opportunity of another network by allocating a transmission idle period for coexistence with a homogeneous or heterogeneous system.

The technical objects of the present invention are not limited to the aforementioned technical objects, and other technical objects, which are not mentioned above, will be apparently appreciated to a person having ordinary skill in the art from the following description.

Advantageous Effects

According to exemplary embodiments of the present invention, a resource access opportunity of another network is provided by allocating a transmission idle period in an unlicensed band and a common use band, and as a result, an LTE system can use a resource through coexistence with a homogeneous or heterogeneous system.

BEST MODE

Figure 1:
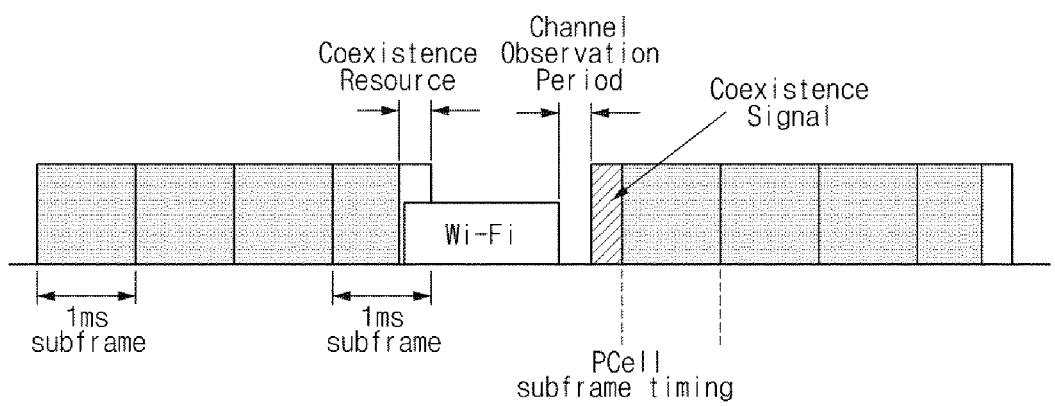
FIG. 1 is a diagram illustrating a frame configuration of an apparatus for allocating a coexistence resource on an unlicensed band according to the present invention.

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as much as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless clearly defined in the present application.

In a 3GPP standard, for a frequency used for wireless access, a term called a "carrier" is physically used and a term called a "cell" is logically used. In Release-10/11, frequency band aggregation (carrier aggregation) technology that aggregates a maximum of 5 carriers is defined and as each carrier, a component carrier is used. In this case, in terms of each terminal (UE), a Scell in which a primary cell (PCell) and a secondary cell (SCell) are defined does not perform synchronization execution, transmission of a physical random access channel (PRACH) and a physical uplink control channel (PUCCH), and the like unlike a Pcell. Further, the Scell may not perform cross scheduling of a resource for the Pcell. The PCell may each vary for all terminals (UE) and switching of the PCell and the SCell may be performed by a handover procedure. Therefore, there is no physical difference in terms of a frame structure and a control channel between the PCell and the SCell.

Meanwhile, since the SCell may not serve as the PCell on an unlicensed band, a signal used in a frame structure different from a SCell of a conventional licensed band may be newly defined. Therefore, it is possible to design a frame in which only a channel state indicator reference signal (CSI-RS) and a demodulation reference signal (DM-RS) exist except for a common reference signal (CRS) used for backward compatibility together with a new frame structure for sharing with WiFi.

In the LTE using the unlicensed band, it may be more efficient to empty the resource for the WiFi for a predetermined time after transmitting/receiving data by consecutively occupying the resource for several milliseconds as much as possible. Therefore, when the number of terminals (UE) which simultaneously transmit/receive data on the unlicensed band is small, completing data transmission within a short time (a small number of subframes) as much as possible is effective in coexistence with a WiFi system.

Accordingly, the present invention intends to propose a technology that allows the LTE to transmit data by using only some subframes and allocate the remaining subframes to a resource having no data or signal to allow the WiFi system to occupy a channel.

In the present invention, the resource may be defined as a coexistence resource and a period in which the coexistence resource is allocated may be defined as a transmission idle period because no data and signal are transmitted.

FIG. 1 is a diagram illustrating a frame configuration of an apparatus for allocating a coexistence resource on an unlicensed band according to the present invention.

Referring to FIG. 1, the apparatus (hereinafter, referred to as 'allocating apparatus') for allocating a coexistence resource on an unlicensed band according to the present invention may allocate a part of a subframe, for example, last n symbols of the subframe as the coexistence resource at the time of configuring the subframe. In this case, during the transmission idle period to which the coexistence resource is allocated, since the allocating apparatus does not transmit any data and/or signal, another homogeneous LTE system and/or WiFi system may occupy the coexistence resource.

When the allocating apparatus does not detect a signal of another system during the transmission idle period, the allocating apparatus occupies the resource again, but when the signal of another system is detected, the allocating apparatus stops transmission of the signal and after the resource occupancy of the corresponding system ends, the allocating apparatus occupies the resource again to transmit data and/or the signal. Therefore, a configuration and an operation for the allocating apparatus will be described in more detail with reference to an exemplary embodiment of FIG. 2.

Figure 2:
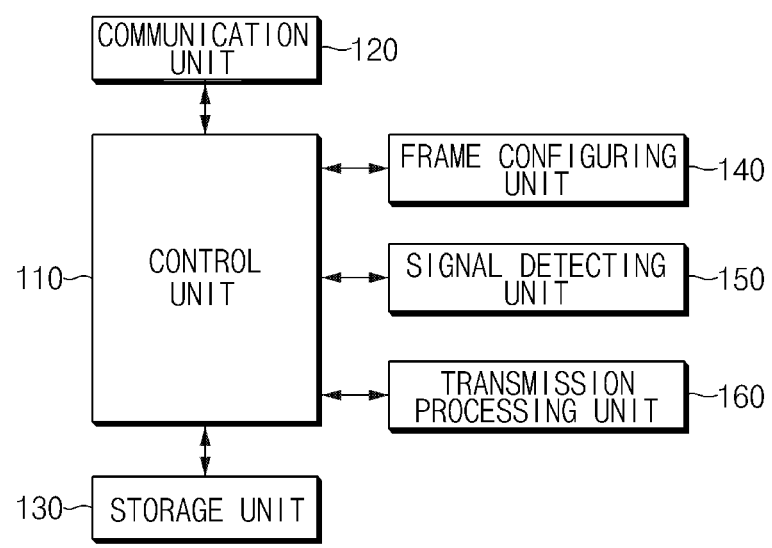
FIG. 2 is a block diagram illustrating a configuration of the apparatus for allocating a coexistence resource on an unlicensed band according to the present invention.

FIG. 2 is a block diagram illustrating a configuration of an apparatus for allocating a coexistence resource on an unlicensed band according to the present invention.

As illustrated in FIG. 2, the allocating apparatus may include a control unit 110, a communication unit 120, a storage unit 130, a frame configuring unit 140, a coexistence resource allocating unit, a signal detecting unit 150, and a transmission processing unit 160. Herein, the control unit 110 serves to process signals transferred among respective units of the allocating apparatus.

The communication unit 120 may include a module for wireless Internet access. Herein, a wireless Internet technology may include long term evolution (LTE). Further, the communication unit 120 may include modules such as wireless LAN (WLAN), wireless broadband (Wibro), Wi-Fi, world interoperability for microwave access (Wimax), and high speed downlink packet access (HSDPA).

The storage unit 130 may store data and a program required for the allocating apparatus to operate. As one example, the storage unit 130 may store an algorithm to allocate the coexistence resource, an algorithm to set the transmission idle period, an algorithm to search a signal in a coexistence resource period, and the like. Further, the storage unit 130 may store frame configuration information, coexistence resource allocation information, transmission idle period setting information, and the like and store condition information for occupying the resource again, and the like.

Herein, the storage unit 130 may include at least one storage medium of a flash memory type, a hard disk type, a multimedia card micro type, a card type memory (for example, an SD or XD memory, or the like), a magnetic memory, a magnetic disk, an optical disk, a random access memory (RAM), a static random access memory (SRMA), a read-only memory (ROM), a programmable read-only memory (PROM), and an electrically erasable programmable read-only memory (EEPROM).

The frame configuring unit 140 may configure a subframe having a predetermined size and allocate some symbols of the subframe as the coexistence resource. Herein, the coexistence resource is a resource which is not used for data transmission and a period to which the coexistence resource is allocated becomes the transmission idle period. In this case, another LTE system of the same type or a heterogeneous system may use the coexistence resource through the transmission idle period.

In this case, as the coexistence resource, one to three OFDM or SCFDM symbols may be allocated and the transmission idle period may in the of 70 μs to 210 μs. As one example, the frame configuring unit 140 may allocate the last n ($1 \leq n \leq 3$) OFDM or SCFDM symbols in a subframe of 1 ms as the coexistence resource. A detailed exemplary embodiment of the operation of allocating the coexistence resource will be described with reference to FIG. 3.

Figure 3:
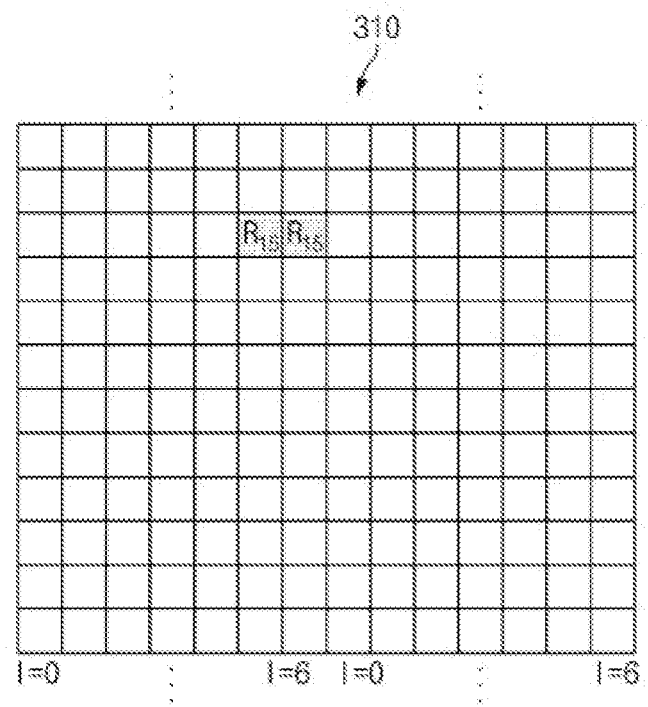
FIGS. 3 and 4 are diagrams illustrating an exemplary embodiment of a coexistence resource allocating operation of the apparatus for allocating a coexistence resource on an unlicensed band according to the present invention.
Figure 3:
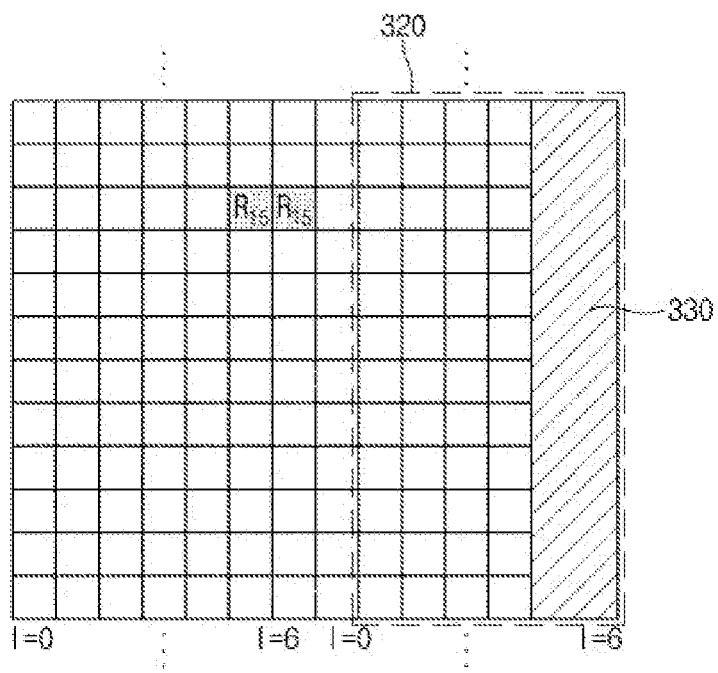

The exemplary embodiment of FIG. 3 represents a subframe including two symbol data and the last two arrays 330 of a second slot 320 to which data and/or a reference signal is not allocated may be allocated as the coexistence resource illustrated in FIG. 3B in a subframe 310 illustrated in FIG. 3A. The coexistence resource is a resource which transmits no signal while including the data and the reference signal.

Further, the frame configuring unit 140 may allocate the coexistence resource for every predetermined period. The frame configuring unit 140 may allocate the coexistence resource to some symbols of a last frame in a subframe of a predetermined period. A detailed exemplary embodiment for an operation of allocating the coexistence resource to the subframe for every predetermined period will be described with reference to FIG. 4.

Figure 4:
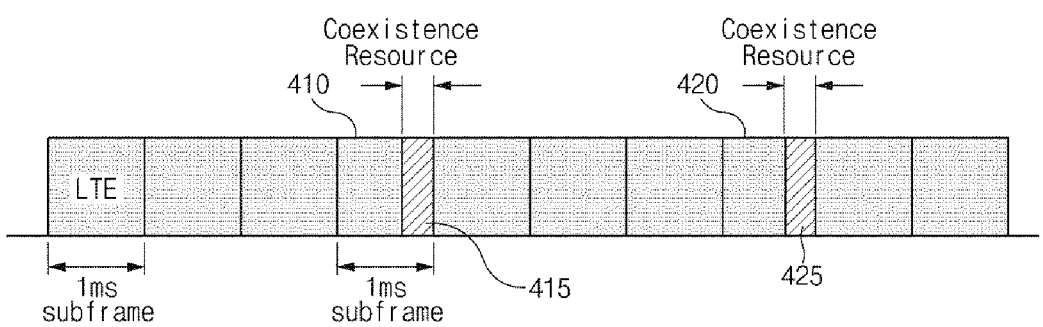

As illustrated in FIG. 4, the frame configuring unit 140 may allocate coexistence resources 415 and 425 to the last subframes 410 and 420 for every period by setting four subframes as one period. In this case, as described in the exemplary embodiment of FIG. 4, the transmission idle period to which the coexistence resource is allocated is generated every four subframes.

The subframe configured by the frame configuring unit 140 may be transmitted by the transmission processing unit 160. In this case, the transmission processing unit 160 transmits a rate matched coded signal by considering the coexistence resource which is not used for the data transmission.

The transmission processing unit 160 transmits a reference signal on the unlicensed band only to a predetermined resource element in a resource allocation period. Herein, the transmission processing unit 160 may use a demodulation reference signal (DM-RS) for a terminal receiving data. Further, the transmission processing unit 160 may transmit a cell specific reference signal for measuring a reference signal received power (RSRP), a reference signal received quality (RSRQ), and the like of a current operating cell for coexistence among different cells.

In this case, in the case of the unlicensed band, since the Scell is different in characteristic from a conventional second cell (Scell) and backward compatibility need not be secured, only user terminal specific reference signals such as the demodulation reference signal (DM-RS) and only a channel state indicator reference signal (CSI-RS) is allocated. Herein, since the DM-RS as technology that distinguishes terminals by transmitting different data signals to terminals in coverage transmits a different signal for each terminal, the DM-RS has efficient performance in terms of interference. Further, the CRI-RS as a technology that communicates with the terminal while respective base stations are distinguished by different channel signals may be used to acquire channel state information of the terminal by estimating the DM-RS.

Figure 5:
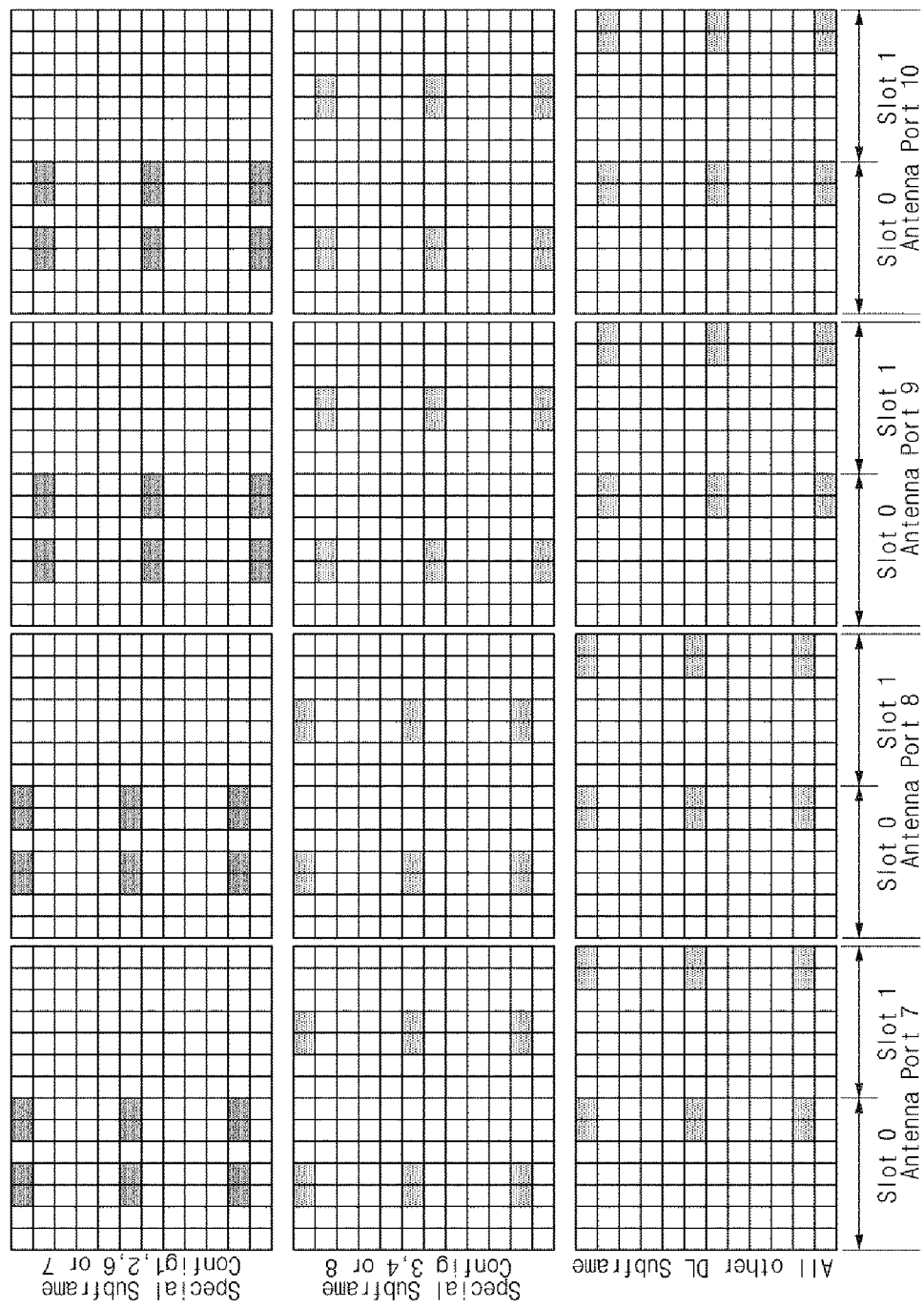
FIG. 5 is a diagram illustrating an exemplary embodiment of a signal detecting operation in a coexistence resource period of the apparatus for allocating a coexistence resource on an unlicensed band according to the present invention.

Therefore, an exemplary embodiment for the DM-RS to which the coexistence resource is allocated will be described with reference to FIG. 5. As illustrated in FIG. 5, the DM-RS may be configured in a structure of a first array or a second array when the coexistence resource is allocated.

Meanwhile, when the transmission processing unit 160 reaches the transmission idle period to which the coexistence resource is allocated by the frame configuring unit 140, the transmission processing unit 160 stops the data transmission. In this case, the signal detecting unit 150 searches the signal from another homogeneous LTE system or heterogeneous system, for example, a WiFi system, and the like.

In the transmission idle period of the LTE system, the WiFi system and/or another homogeneous LTE system acquires a resource access opportunity for the coexistence resource of the LTE system. In this case, when the WiFi signal is detected as a search result of the signal detecting unit 150 in the transmission idle period, the transmission processing unit 160 does not occupy a resource of a next subframe for a predetermined period and abdicates the corresponding resource to the WiFi system. In this case, period that abdicates the resource to the WiFi system may be determined by the transmission processing unit 160.

The transmission processing unit 160 first defines the size of a transmission stop period of the LTE system and stops signal transmission. Herein, the transmission processing unit 160 may define a minimum size of the transmission stop period.

In this case, the transmission processing unit 160 transmits the data by occupying the resource again when it is verified that another signal does not exist during a channel observation period after the minimum transmission stop period.

Herein, the transmission processing unit 160 occupies the resource when the channel is in the idle state after Δt at a stand-by delay time such as a short inter-frame space (SIFS) or a distributed inter-frame space (DIFS) after resource occupancy of the WiFi system for the coexistence resource ends.

As one example, the transmission processing unit 160 may occupy the resource when the channel is in the idle state after L subframes stop. Further, the transmission processing unit 160 may occupy the resource when the corresponding channel is in the idle state after M orthogonal frequency division multiplexing (OFDM) symbols stop. In addition, the transmission processing unit 160 may occupy the resource when the corresponding channel is in the idle state after N slots stops (slot mute). An exemplary embodiment therefor will be described with reference to FIGS. 6 to 8.

Figure 6:
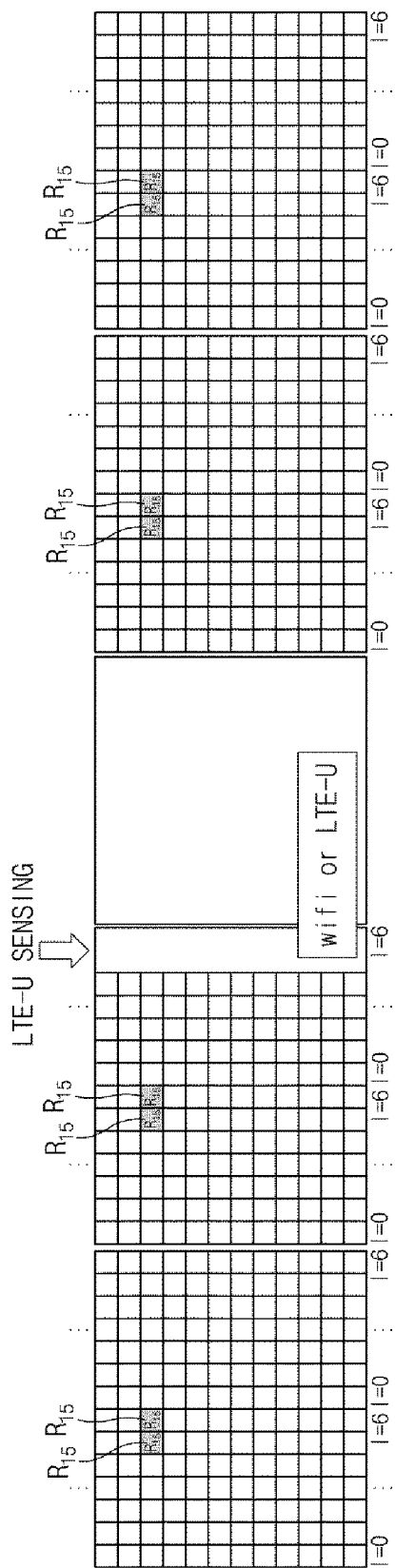
FIGS. 6 to 8 are diagrams illustrating an exemplary embodiment of a transmission idle period of the apparatus for allocating a coexistence resource on an unlicensed band according to the present invention.

First, FIG. 6 illustrates an exemplary embodiment when transmission stops at a subframe period after a signal is detected in the transmission idle period. As illustrated in FIG. 6, in the transmission idle period in which the coexistence resource is allocated to the subframe, the WiFi system and/or another homogeneous LTE system may sense the coexistence resource. In this case, when the WiFi signal or another LTE signal is detected by the signal detecting unit 150 in the transmission idle period, the transmission processing unit 160 stops the transmission at the subframe period. Thereafter, the transmission processing unit 160 occupies the resource again to transmit data of the subframe when the corresponding channel is in the idle state.

Figure 7:
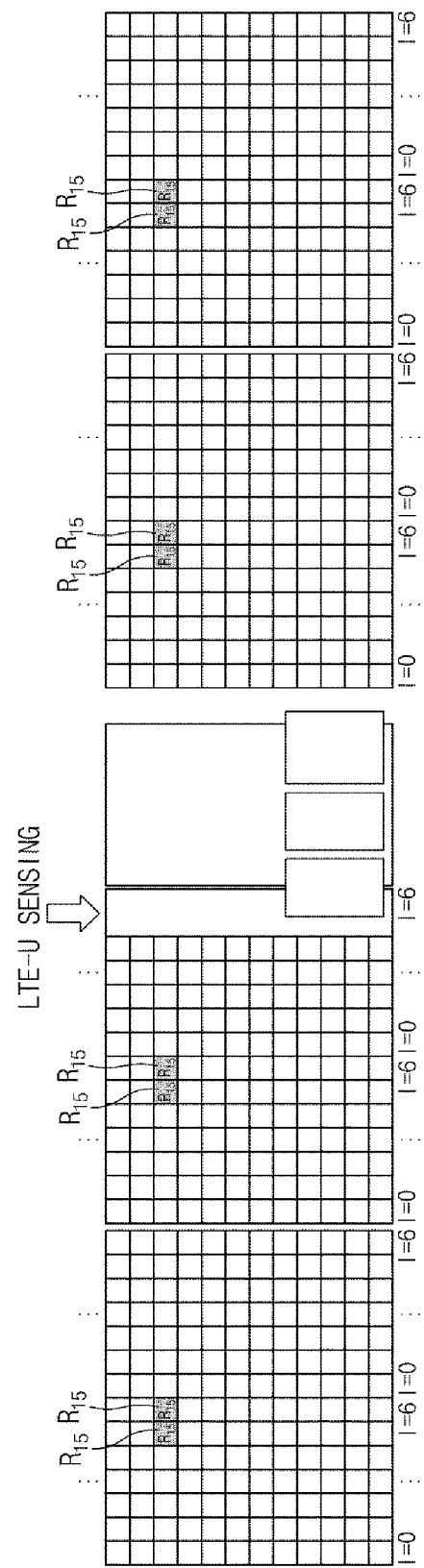

FIG. 7 illustrates an exemplary embodiment when transmission of the OFDM symbol stops after a signal is detected in the transmission idle period. As illustrated in FIG. 7, when the WiFi signal or another LTE signal is detected by the signal detecting unit 150 in the transmission idle period in which the coexistence resource is applied to the subframe, the transmission processing unit 160 stops the transmission of the OFDM symbol. Thereafter, the transmission processing unit 160 verifies that the corresponding channel is in the idle state and occupies the resource of the corresponding channel again to transmit the OFDM symbol.

Figure 8:
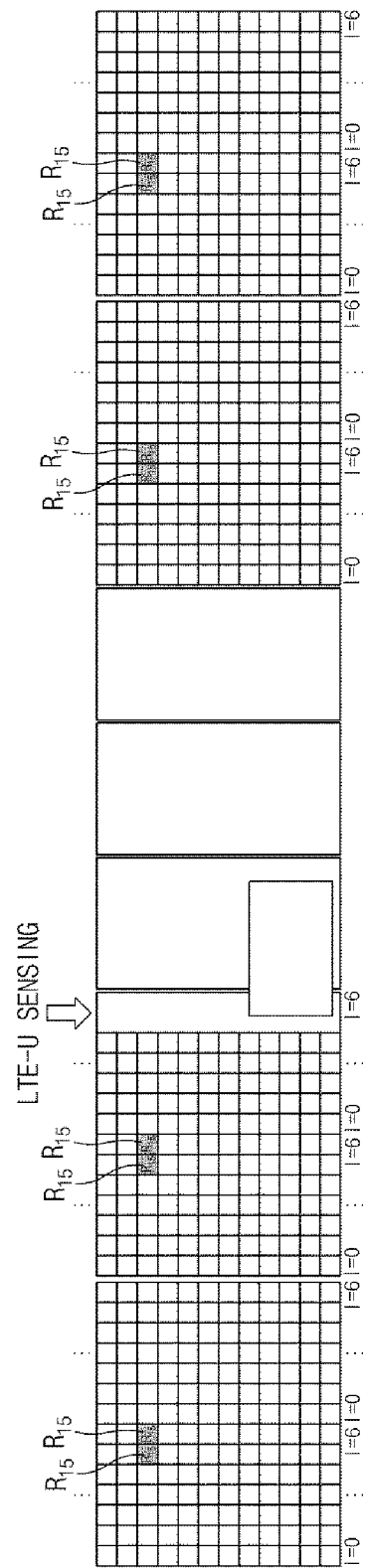

FIG. 8 illustrates an exemplary embodiment when slot transmission stops after a signal is detected in the transmission idle period. As illustrated in FIG. 8, when the WiFi signal or another LTE signal is detected by the signal detecting unit 150 in the transmission idle period in which the coexistence resource is allocated to the subframe, the transmission processing unit 160 stops the slot transmission. Thereafter, the transmission processing unit 160 verifies that the corresponding channel is in the idle state and occupies the resource of the corresponding channel again to transmit the slot. In this case, a time of reoccupying a radio resource may be distinguished according to whether an unlicensed cell (UCell) and a primary cell (PCell) are synchronized with each other.

Figure 9:
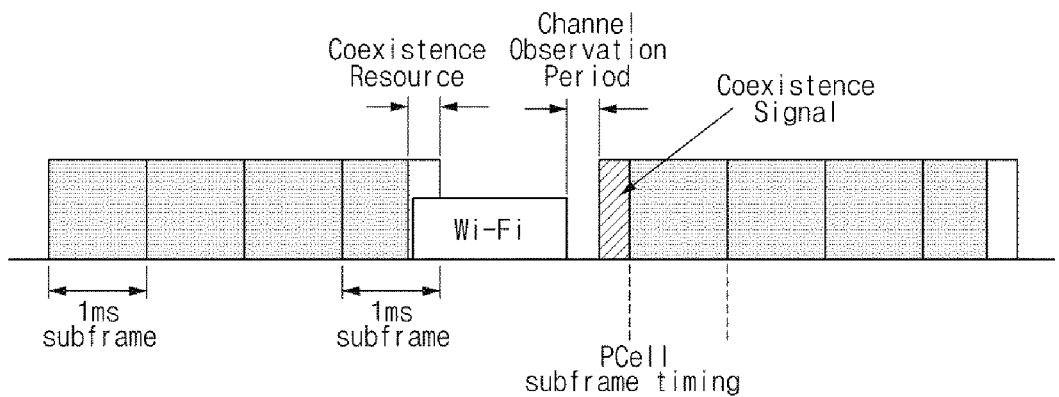
FIGS. 9 and 10 are diagrams illustrating a relationship between a licensed band cell and an unlicensed band cell in the apparatus for allocating a coexistence resource on an unlicensed band according to the present invention.

First, the transmission processing unit 160 may occupy the resource according to a subframe time of the primary cell (PCell) and transmit data of the subframe while the reoccupancy of the resource is possible. In this case, the coexistence signal for the resource access may be first transmitted before the resource occupancy time. Herein, the coexistence signal may be used for automatic gain control (AGC), time synchronization, resource propagation, and the like. An exemplary embodiment therefor will be described with reference to FIG. 9.

Figure 10:
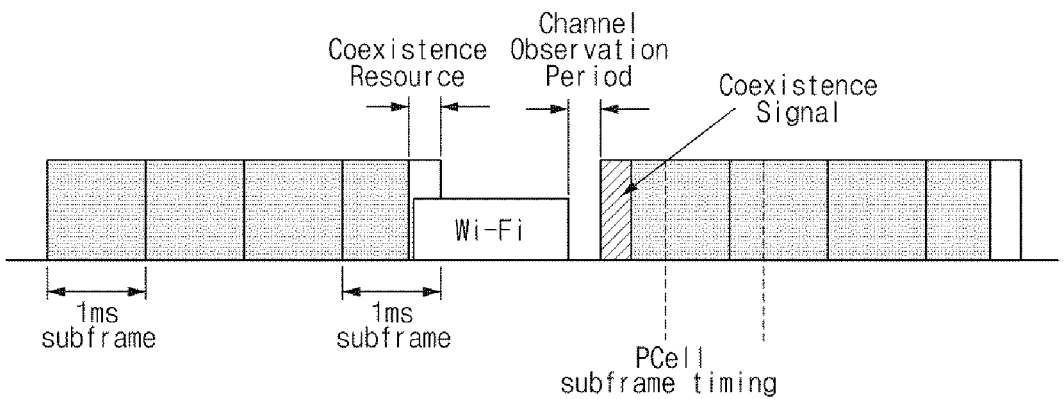

On the contrary, the transmission processing unit 160 may occupy the resource after channel monitoring (listen before talk (LBT)) regardless of the subframe time of the primary cell (PCell) while the reoccupancy of the resource is possible. Similarly, in this case, the transmission processing unit 160 may first transmit the coexistence signal for the resource access before the resource occupancy time. An exemplary embodiment therefor will be described with reference to FIG. 10.

Thereafter, the transmission processing unit 160 may announce coexistence resource allocation information to the base station.

As one example, the coexistence resource allocation information may be transferred as a semi statistic radio resource control (RRC) message. In this case, the RRC message may be transferred to each terminal as a system information block (SIB). In this case, the base station may designate the subframe including the coexistence resource. In this case, the base station may allocate the coexistence resource by using n symbols every consecutive N-th subframe.

Further, when the coexistence resource allocation information is dynamically newly defined for each subframe by a physical downlink control channel (PDCCH), associated information may be defined in the PDCCH of the PCell or associated information may be defined in the PDCCH of the UCell or a new channel. In this case, the base station is expressed as a flag in a common search space of the PDCCH or allocates a specific sequence to a specific resource element to detect the specific sequence as a correlation result.

An operational flow of the apparatus according to the present invention, which is configured as above will be described below in more detail.

Figure 11:
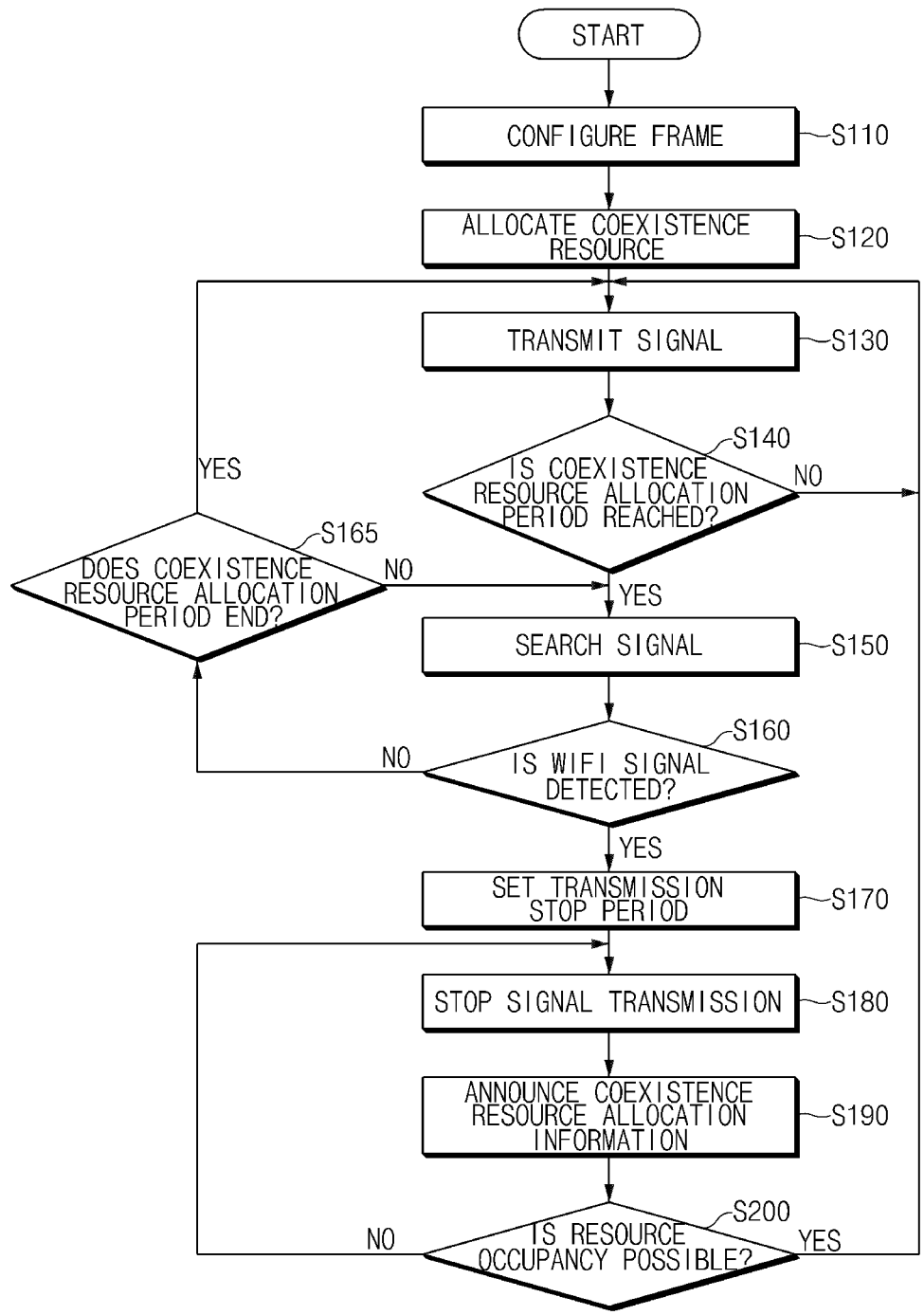
FIG. 11 is a diagram illustrating an operational flow for a method for allocating a coexistence resource on an unlicensed band according to the present invention.

FIG. 11 is a diagram illustrating an operational flow for a method for allocating a coexistence resource on an unlicensed band according to the present invention. As illustrated in FIG. 11, the allocating apparatus according to the present invention configures a frame (S110) to allocate a coexistence resource to a subframe (S120). In this case, the allocating apparatus transmits a signal including data and/or a reference signal allocated to the subframe in a resource occupancy period of the subframe (S130).

Meanwhile, when a period in which the coexistence resource is allocated in the subframe, that is, the transmission idle period is reached (S140), the allocating apparatus searches the signal from another homogeneous LTE system and/or WiFi system (S150).

When the WiFi signal is not detected during process 'S150' (S160), the allocating apparatus searches the signal until a period in which the coexistence resource is allocated ends (S165 and S150) and when another signal is not detected until the period in which the coexistence resource is allocated ends, process 'S130' is reperformed.

On the contrary, when the WiFi signal is detected during process 'S150' (S160), the allocating apparatus sets the transmission stop period (S170) and stops signal transmission (S180). In this case, the coexistence resource is occupied by the WiFi system in which the signal is detected to transmit the signal during process 'S160'.

The allocating apparatus determines whether the resource occupancy of the WiFi system ends and the channel is in the idle state to verify an occupiable state of the resource (S190). When the resource occupancy is possible during process 'S190', the allocating apparatus occupies the resource again (S200) to transmit the signal including the data and/or the reference signal allocated to the subframe (S130). Herein, the allocating apparatus announces allocation information of the coexistence resource to the base station, and the like (S210).

Figure 12:
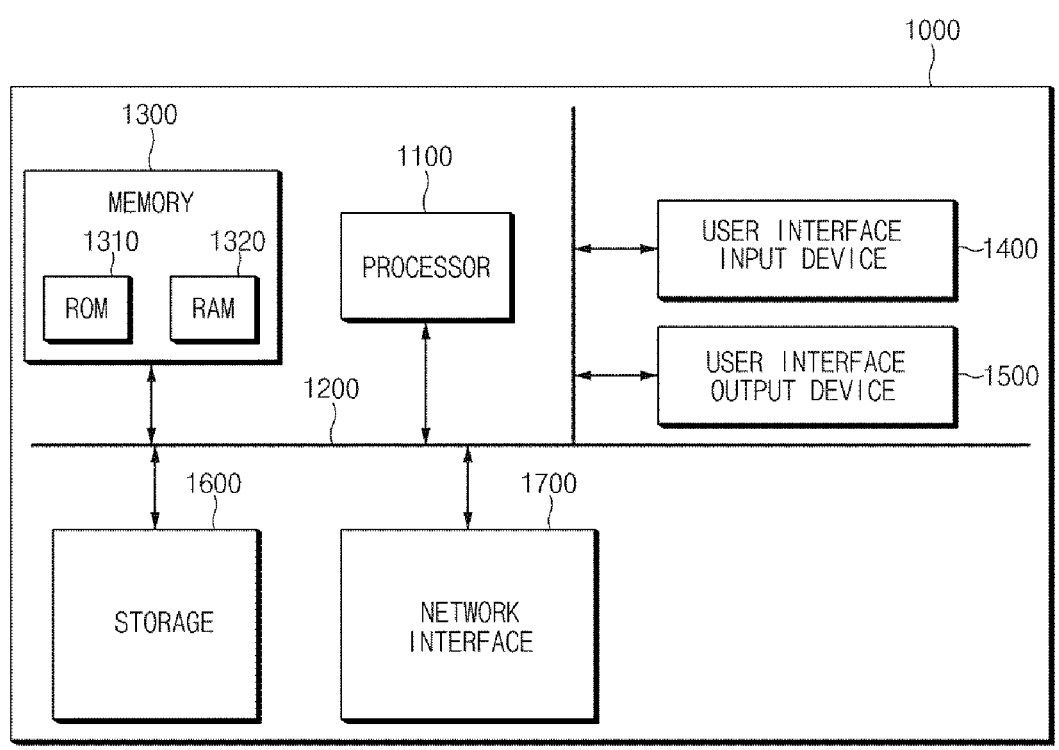
FIG. 12 is a diagram illustrating a computing system to which the apparatus according to the present invention is applied.

Meanwhile, FIG. 12 is a diagram illustrating a computing system to which the apparatus according to the present invention is applied. Referring to FIG. 12, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in user equipment. As yet another method, the processor and the storage medium may reside in the user terminal as individual components.

The above description just illustrates the technical spirit of the present invention and various modifications and transformations can be made by those skilled in the art without departing from an essential characteristic of the present invention.

Therefore, the embodiments disclosed in the present invention are used to not limit but describe the technical spirit of the present invention and the scope of the technical spirit of the present invention is not limited by the embodiments. The scope of the present invention should be interpreted by the appended claims and it should be analyzed that all technical spirit in the equivalent range thereto is intended to be embraced by the present invention.

The invention claimed is:

1. An apparatus for allocating a coexistence resource on an unlicensed band, the apparatus comprising:
   a processor; and
   a memory storing at least one instruction executed by the processor;
   wherein, the at least one instruction is configured to:
      configure a plurality of subframes, each subframe including a payload resource and the coexistence resource, the coexistence resource located after the payload resource in each subframe;
      monitor the coexistence resource included in a subframe # n among the plurality of subframes, to detect a signal from another system in the coexistence resource of the subframe # n; and
      when the signal is not detected in the coexistence resource of the subframe # n, transmit a data unit and a reference signal in the payload resource included in a next subframe # n+1, among the plurality of subframes,
   wherein the coexistence resource is not used for transmitting the data unit and the reference signal, the coexistence resource is different from the payload resource, and the coexistence resource occupies one or more symbols among a last one or three symbols in each of the plurality of subframes.

2. The apparatus for allocating a coexistence resource on an unlicensed band of claim 1, wherein the coexistence resource is allocated by using a last subframe every predetermined period.

3. The apparatus for allocating a coexistence resource on an unlicensed band of claim 1, wherein the apparatus defines a minimum size of a transmission stop period for an LTE system when the signal from another system is detected in the coexistence resource.

4. The apparatus for allocating a coexistence resource on an unlicensed band of claim 3, wherein the apparatus transmits the data unit and the reference signal when the signal from another system is not detected during a channel observation period after the transmission stop period.

5. The apparatus for allocating a coexistence resource on an unlicensed band of claim 1, wherein the apparatus transmits the data unit and the reference signal when a channel is in an idle state after Δt at a stand-by delay time such as a short inter-frame space (SIFS) or a distributed inter-frame space (DIFS) after coexistence resource occupancy of another system ends.

6. The apparatus for allocating a coexistence resource on an unlicensed band of claim 5, wherein the apparatus transmits the data unit and the reference signal when the channel is in the idle state after a predetermined plurality of subframes stops.

7. The apparatus for allocating a coexistence resource on an unlicensed band of claim 5, wherein the apparatus transmits the data unit and the reference signal when the corresponding channel is in the idle state after a predetermined plurality of orthogonal frequency division multiplexing (OFDM) symbols stops.

8. The apparatus for allocating a coexistence resource on an unlicensed band of claim 5, wherein the apparatus transmits the data unit and the reference signal when the channel is in the idle state after a predetermined plurality of slots stops (slot mute).

9. The apparatus for allocating a coexistence resource on an unlicensed band of claim 1, wherein the apparatus transmits the data unit and the reference signal according to a subframe time of a primary cell (PCell) while reoccupancy of the resource is possible after the coexistence resource occupancy of another system ends.

10. The apparatus for allocating a coexistence resource on an unlicensed band of claim 1, wherein the apparatus transmits the data unit and the reference signal after channel monitoring (listen before talk (LBT)) regardless of the subframe time of the primary cell (PCell) while the reoccupancy of the resource is possible after the coexistence resource occupancy of another system ends.

11. The apparatus for allocating a coexistence resource on an unlicensed band of claim 1, wherein the apparatus announces allocation information of the coexistence resource to a terminal or a base station.

12. A method for allocating a coexistence resource on an unlicensed band, the method comprising:
configuring a plurality of subframes, each subframe including a payload resource and the coexistence resource, the coexistence resource located after the payload resource in each subframe;
monitoring the coexistence resource included in a subframe # n, among the plurality of subframes, to detect a signal from another system in the coexistence resource of the subframe # n; and
when the signal is not detected in the coexistence resource of the subframe # n, transmitting a data unit and a reference signal in the payload resource included in a subframe # n+1, among the plurality of subframes,
wherein the coexistence resource is not used for transmitting the data unit and the reference signal, the coexistence resource is different from the payload resource, and the coexistence resource occupies one or more symbols among a last one or three symbols in each of the plurality of subframes.

13. The method for allocating a coexistence resource on an unlicensed band of claim 12, wherein the coexistence resource is allocated by using a last one or three symbols of a last subframe every predetermined period.

14. The method for allocating a coexistence resource on an unlicensed band of claim 12, further comprising:
defining a minimum size of a transmission stop period for an LTE system when the signal from another system is detected in the coexistence resource,
wherein in the transmitting the data unit and the reference signal, the data unit, and the reference signal are transmitted when the signal from another system is not detected during a channel observation period after the transmission stop period.

15. The method for allocating a coexistence resource on an unlicensed band of claim 14, wherein in the transmitting the data unit and the reference signal, the data unit and the reference signal are transmitted when a channel is in an idle state after a predetermined plurality of subframes stops.

16. The method for allocating a coexistence resource on an unlicensed band of claim 14, wherein in the transmitting the data unit and the reference signal, the data unit and the reference signal are transmitted when the corresponding channel is in the idle state after a predetermined plurality of orthogonal frequency division multiplexing (OFDM) symbols stops.

17. The method for allocating a coexistence resource on an unlicensed band of claim 14, wherein in the transmitting the data unit and the reference signal, the data unit and the reference signal are transmitted when the corresponding channel is in the idle state after a predetermined plurality of slots stops (slot mute).

18. The method for allocating a coexistence resource on an unlicensed band of claim 14, wherein in the transmitting the data unit and the reference signal, the data unit and the reference signal are transmitted according to a subframe time of a primary cell (PCell) while reoccupancy of the resource is possible after the coexistence resource occupancy of another system ends.

19. The method for allocating a coexistence resource on an unlicensed band of claim 14, wherein in the transmitting the data unit and the reference signal, the data unit and the reference signal are transmitted after channel monitoring (listen before talk (LBT)) regardless of the subframe time of the primary cell (PCell) while the reoccupancy of the resource is possible after the coexistence resource occupancy of another system ends.

* * * * *